Jan. 14, 1930.  W. RAHE  1,743,391
AUTOMOBILE BUMPER
Filed Dec. 21, 1927  2 Sheets-Sheet 1
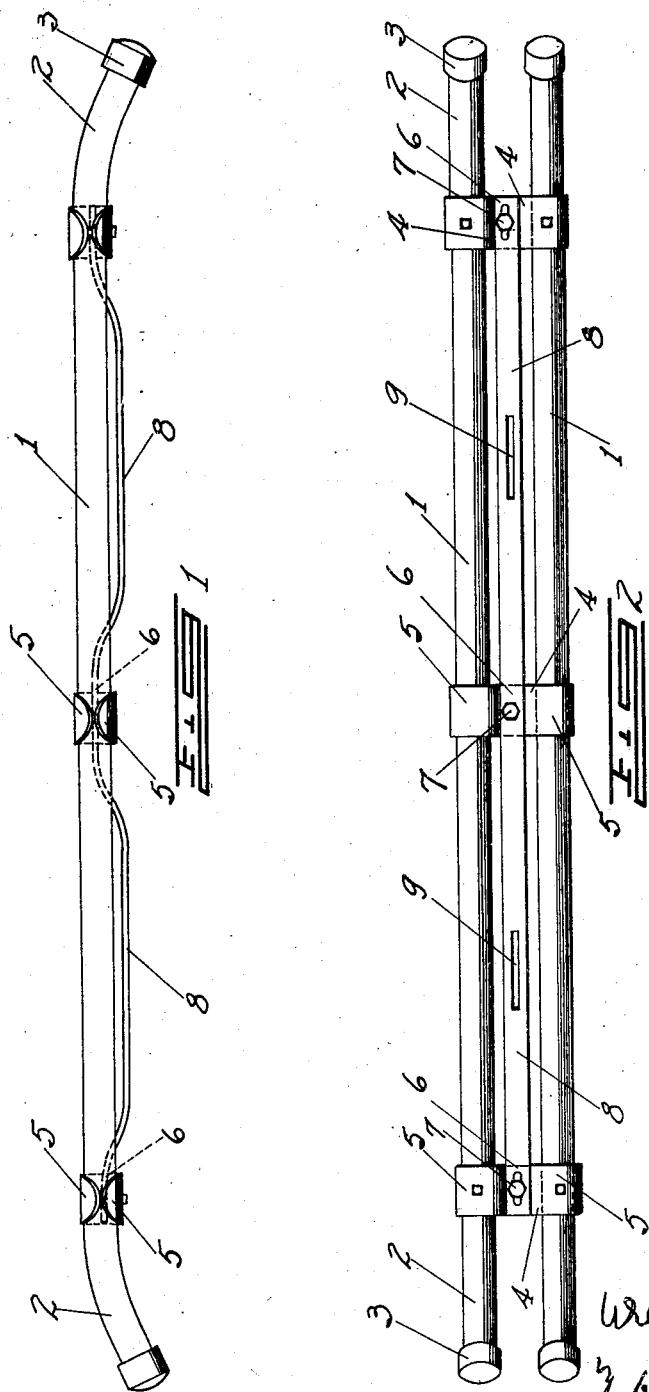

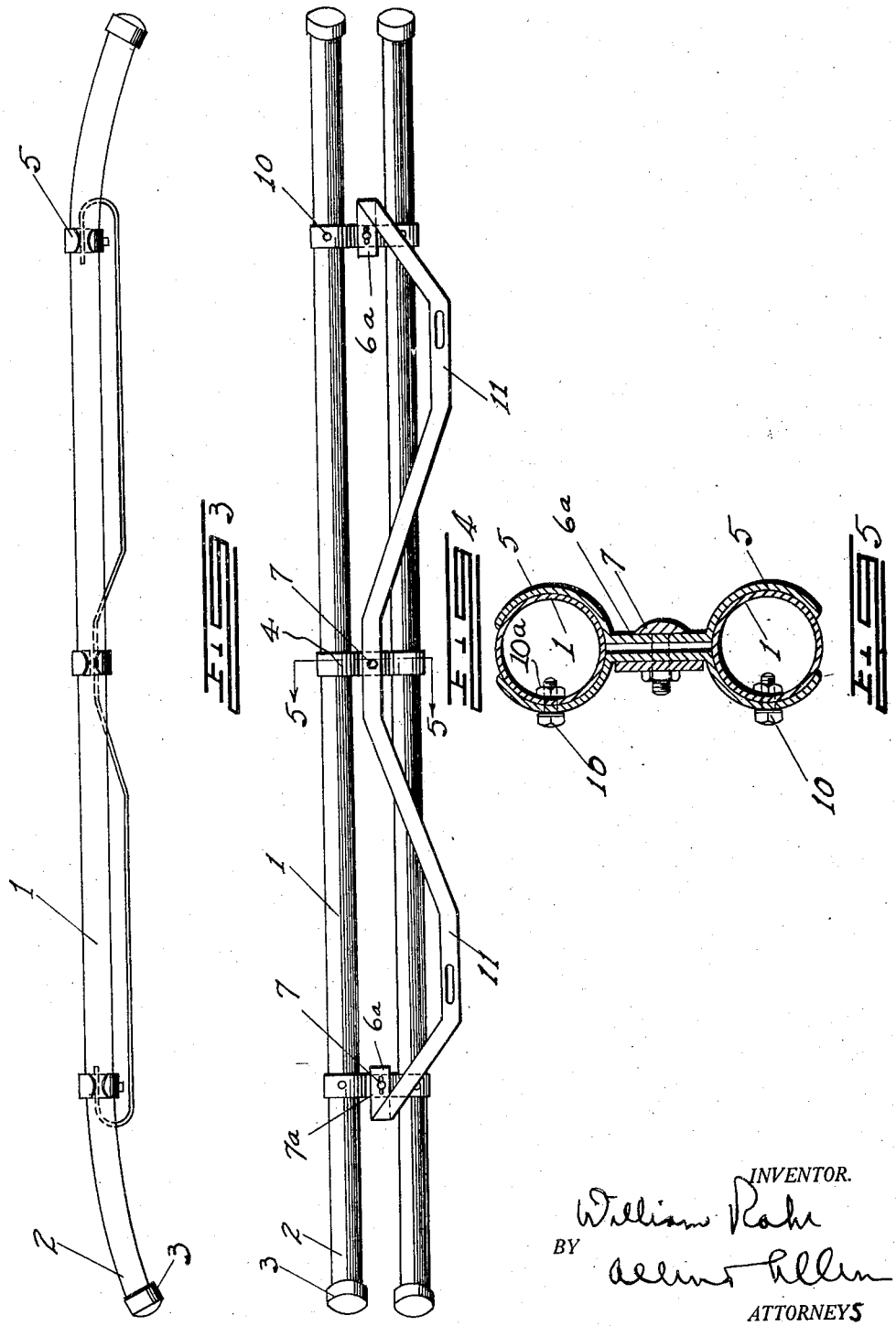

Patented Jan. 14, 1930

1,743,391

UNITED STATES PATENT OFFICE

WILLIAM RAHE, OF CINCINNATI, OHIO

AUTOMOBILE BUMPER

Application filed December 21, 1927. Serial No. 241,659.

My invention relates to automobile bumpers particularly of the plural bar type.

In my co-pending application, Serial No. 123,995, filed July 21, 1926, and issued April 17, 1928, as Patent 1,666,754 I have described a bumper supported on a pair of plural S-shaped springs. The bumper bar unit which is described herein is of the same description as the unit shown in this copending case.

It is the object of my invention to provide a pair of bumper bars connected and held in position with a plurality of clips which are attached to a resilient support comprising a spring member. It is further my object to so shape the supporting member that it will lie flat against the clips to which it is attached but will be bent or bowed backwardly from the clips so that when a blow is directed against the bumper bars the support will tend to distribute the force of the blow longitudinally of the bars.

The above and other objects to which reference will be made in the ensuing disclosure I accomplish by that certain combination and arrangement of parts of which I have shown a preferred embodiment.

Referring to the drawings:—

Figure 1 is a plan view of the bumper bar unit.

Figure 2 is a rear elevation thereof taken from the side which is attached to the car.

Figure 3 is a plan view of a modified type of bumper.

Figure 4 is a rear elevation of the modified type shown in Figure 3.

Figure 5 is a section taken along the line 5—5 in Figure 4.

Referring first to Figures 1 and 2, I have shown the pair of bars 1 which extend laterally across the front end of the car and have rearwardly bowed ends 2 on which caps 3 are mounted for reinforcing the tubes forming the bars so that blows on the ends of the bars will not tend to squeeze the sides of the ends of the bars together. The bars are supported as a unit by three sets of clips formed of cast or stamped metal. The clips have E-shaped bodies with flattened central portions 4 having apertures therethrough through which mounting bolts are secured and curved upper and lower portions 5 which partially embrace the bars 1. The extent of the curvature of the upper and lower ends of the portions 5 is such that when two sets of clips are mounted as supports for the bars the upper and lower ends will not abut, whereby the greater the force with which the clips are drawn together at their portions 4, the stronger will be the clamping grip of the clips on the bars.

The resilient support for the bumper which is connected to the clips is composed preferably of an integral piece of spring steel of flattened shape, having a portion 6 which lies parallel with the portions 4 of the clips, and thus may be drawn tightly against the clips by means of the nuts and bolts 7, which pass through elongated holes 7ª. Rivets may also be used to mount the bar, clip and support assembly together. The metal piece forming the support has backwardly bowed portions 8 having slots 9 therein which provide a simple form of attachment with whatever type of bracket or spring they may be attached on the front or rear of an automobile.

In my co-pending case heretofore referred to the bar units are mounted on springs, but I do not wish to limit myself herein to any particular type of mounting. With the elongated slots 9 formed in the backwardly bowed portions of the supports it will be obvious that bolts may be extended from the automobile in any desired way, merely being passed through the slots and having their nuts tightened down. The slotted holes allow a movement of the resilient member when the bumper receives an impact. Brackets may also be used for attaching the supports to the automobile frame.

While I have shown a double bar bumper it will be obvious that the same mounting arrangement could be employed for more than two bars, in which case the clips would have an additional semi-loop to embrace each additional bar over two. Further, while three sets or pairs of clips are shown, the functional advantages would be achieved if the number of pairs of clips were either increased or decreased.

In the modifications shown in Figures 3-5 the pair of bars 1 have bowed ends 2 with caps 3 just as in the type illustrated in Figures 1 and 2. Clips having flattened central portions 4 and curved portions 5 are also employed. The resilient support in this modification is shaped differently as the ends of the support have return bent portions 6ª as indicated. Further, in order to provide a mounting which will readily fit on the vehicle frame I have found it advisable to bend the resilient supports downwardly as indicated at 11, so that the part of the bumper assembly which is attached to the vehicle frame will be at a lower elevation than the bumper bars, so that the bumper bars will provide more adequate protection for the top of the fenders. Nuts and bolts 7 are used for tightening the clips on the bars and preferably the clips are bolted to the bars as with the bolts 10, which have square nuts 10ª which gouge into the walls of the bars and prevent any likelihood of the bars turning under severe impact.

In use a blow directed against the double bar from the front will cause the backwardly bowed portions to expand longitudinally, thereby distributing the force of the blow throughout the length of the double bars and directly backward against the automobile. I find the unit described will withstand exceptionally severe blows without showing any tendency to become bent out of shape. The slots in the supporting piece also provide a simple way to allow for adjustment to different types of attachments and for different makes of automobiles.

Having thus described my invention, what I claim as new and desire to secure by Letters Patent, is:—

1. A plural bar bumper comprising a plurality of bumper bars, clips having curved ends mounted in pairs on opposite sides of said bars, said pairs of oppositely mounted clips being adapted with the exertion of pressure drawing them together at their middle portions to embrace and securely clamp said bars, and a support with which the plural bars are attached to an automobile comprising a resilient metal piece having portions adapted to engage the central portions of each pair of clips, said piece having backwardly bowed portions between those portions which engage the clips, and means for securing the clips and plural bars on said piece.

2. A plural bar bumper comprising a plurality of bumper bars, clips having curved ends mounted in pairs on opposite sides of said bars, said pairs of oppositely mounted clips being adapted with the exertion of pressure drawing them together at their middle portions to embrace and securely clamp said bars, and a support with which the plural bars are attached to an automobile comprising a resilient metal piece having portions adapted to engage the central portions of each pair of clips, said piece having backwardly bowed portions between those portions which engage the clips, and means for securing the clips and plural bars on said piece, said means comprising means extending from the piece passing through the central portions of each pair of clips.

3. A plural bar bumper comprising a plurality of bumper bars, clips having curved ends mounted in pairs on opposite sides of said bars, said pairs of oppositely mounted clips being adapted with the exertion of pressure drawing them together at their middle portions to embrace and securely clamp said bars, and a support with which the plural bars are attached to an automobile comprising a resilient metal piece having portions adapted to engage the central portions of each pair of clips, said piece having backwardly bowed portions between those portions which engage the clips, and means for securing the clips and plural bars on said piece, said means comprising means extending from the piece passing through the central portions of each pair of clips, and the backwardly bowed portions of said piece being provided with means for attachment to an automobile.

4. A plural bar bumper comprising a plurality of bumper bars, clips having curved ends mounted in pairs on opposite sides of said bars, said pairs of oppositely mounted clips being adapted with the exertion of pressure drawing them together at their middle portions to embrace and securely clamp said bars, and a support with which the plural bars are attached to an automobile comprising a resilient metal piece having portions adapted to engage the central portions of each pair of clips, said piece having backwardly bowed portions between those portions which engage the clips, and means for securing the clips and plural bars on said piece, said means comprising means extending from the piece passing through the central portions of each pair of clips, and the backwardly bowed portions of said piece being provided with means for attachment to an automobile comprising elongated slots.

5. A double bumper bar comprising a pair of bars, clamps for engaging the bars, and a resilient member extending parallel with the bars between the bars and engaging said clamps, said member having downwardly bent portions for attachment to a vehicle frame.

6. A double bumper bar comprising a pair of tubular bars, clamps for engaging the tubular bars, and a resilient support extending parallel with the tubular bars and between the tubular bars in which position it engages said clamps.

7. A double bumper bar comprising a pair of tubular bars, clamps for engaging the tubular bars, and a resilient support extending parallel with the tubular bars between the tubular bars and engaging said clamps, said member having slotted holes to permit the longitudinal expansion of said support.

8. A double bumper bar comprising a pair of tubular bars, clamps for engaging the tubular bars, and a resilient support extending parallel with the tubular bars between the tubular bars and engaging said clamps, and means for mounting said bumper disposed between the portions in which said tubular bars engage said clamps.

9. A double tubular bar bumper provided with a series of pairs of clamps each of which extend on opposite sides of said tubular bars, and resilient means for mounting the bumper assembly secured to said clamps.

10. A double tubular bar bumper provided with a series of pairs of clamps each of which extend on opposite sides of said tubular bars, and resilient means for mounting the bumper assembly secured to said clamps, said means being expandible longitudinally of said tubular bars.

11. A double tubular bar bumper provided with a series of pairs of clamps each of which extend on opposite sides of said tubular bars, and resilient means for mounting the bumper assembly secured to said clamps, and said resilient mounting means having portions bowed backwardly from the points of attachment to said pairs of clamps.

12. A double bar bumper having a pair of tubular bars and a plurality of clamps holding said tubular bars together, and resilient supporting means expandible longitudinally of the tubular bars, said supporting means having slotted holes for the purposes described.

13. A double bar bumper having a pair of tubular bars and three or more spaced clamps holding said tubular bars together, and means for mounting the bumper assembly attached on the outer of said clamps.

WILLIAM RAHE.